Patented May 7, 1946

2,400,054

UNITED STATES PATENT OFFICE 2,400,054

POLYDISPERSIONS CONTAINING CURABLE SYNTHETIC RUBBER

Jack D. Robinson, Painesville, Ohio, and Frederick J. Myers, Philadelphia, Pa., assignors to The Resinous Products & Chemical Company, Philadelphia, Pa., a corporation of Delaware No Drawing. Application September 27, 1943, Serial No. 504,062

7 Claims. (Cl. 260—31)

This invention relates to poly-disperse systems in which there are in suspension in an aqueous medium particles containing rubber, whether natural or synthetic, and separate particles of a highly condensed and polymerized plastic composition obtained by reacting an oil-modified alkyd resin and an organic solvent-soluble carbamide-aldehyde-alcohol condensate. It further relates to the impregnating and coating of fibrous materials and fabrics with the said poly-disperse systems. In particular, this application is directed to the poly-disperse systems which comprise dispersions of curable or cured synthetic rubbers in conjunction with dispersed particles of said plastic compositions, claims to poly-disperse systems from rubber and said plastic composition having been made in application Serial No. 358,838, filed September 28, 1940, now United States Patent 2,346,083, issued April 4, 1944, of which this case is a continuation-in-part.

It has been found that aqueous suspensions containing both kinds of particles yield deposits possessing properties lacking or deficient in films of the individual components. Thus, a coating from a mixed dispersion of rubber and of the insoluble reaction product of an oil-modified alkyd resin and a urea-formaldehyde-alcohol condensate will be flexible and tough even beyond the extent to be predicted from the components. At the same time the coating will be less tacky, possess improved gloss, present grease-resistance, and exhibit other desirable properties. Ageing properties of the films are greatly improved over rubber films.

The poly-disperse systems of this invention are obtained by mixing a suspension of synthetic or natural rubber particles with a suspension of the insoluble reaction product of an oil-modified alkyd resin and carbamide-aldehyde-alcohol condensate. The two separate suspensions are first separately obtained or prepared and may be adjusted to desired solids content within wide limits. It is, of course, essential that the nature of the two types of suspensions be such that they are compatible on being mixed. This requires, for example, similarity in ionic charge. Also, conditions of pH must be such that one suspension will not cause coagulation or precipitation of the other. This is particularly true of rubber dispersions in the form of latex, which are usually protected with an alkaline medium, such as an ammoniacal solution, and are coagulated with acid.

The aqueous dispersion of rubber may be in the form of latex or a vulcanized latex. The latex may be of the normal or usual concentration or of the concentrated type. As is known, rubber latex particles are composed of rubber hydrocarbons, protein, and other materials. Dispersions are also obtainable from rubber in the reclaimed state. Similar but not identical dispersions may be prepared from coagulated or crude rubber as is known in the art, and from polymerized diolefines, haloprenes, or polysulfides used in making so-called "synthetic rubber."

These synthetic rubbers are based on vulcanizable compositions which are commercially available under such names as "Buna S," "Buna N," "Perbunan," "Chemigum," "Ameripol," "Hycar," "Butyl Rubber," Neoprene, and "Thiokol." These are often provided in various grades or modifications. The last-named is the condensation product of organic halides, such as dichloroethylene and $\beta,\beta'$-dichlorodiethyl ether, and inorganic polysulfides, such as sodium polysulfide, and is sold in a number of types and grades, usually designated by various letters. The other compounds are based upon doubly unsaturated aliphatic chains, particularly butadiene, which in the case of Neoprene is halogen-substituted to give haloprenes. The first six trade products enumerated above are based primarily upon butadiene which is co-polymerized with styrene to give the Buna S-type rubber or acrylonitrile to give the Perbunan-type rubber which is particularly resistant to hydrocarbons. Butyl rubber contains polyisobutylene along with sufficient butadiene to render the combination vulcanizable.

While at times other types of polymeric products are loosely referred to as "synthetic rubbers," it will be noted that all of the above-enumerated synthetic rubbers are of the vulcanizable type. It should be further noted here that the latices of synthetic rubber include not only the polymerized unvulcanized synthetic rubbers, but also dispersions of such rubbers in partially or completely vulcanized form.

The reaction product of an oil-modified alkyd-type resin and an organic solvent-soluble carbamide-aldehyde-alcohol condensate is prepared by mixing the resin and condensate and heating the mixture while it is worked mechanically. There results a non-reactive, converted plastic composition of limited thermoplasticity.

The alkyd resins which may be used are made from a polyhydric alcohol, such as glycerol, polyglycerol, ethylene glycol, polyethylene glycol, pentaerythritol, sorbitol, mannitol, or the like, a resin-forming dicarboxylic acid, such as phthalic, maleic, succinic, adipic, sebacic, etc., or a polybasic acid, such as citric, and a fatty acid or glyceride, such as lauric, myristic, stearic, oleic, ricinoleic, hydroxystearic, etc. acid, or comparable oil such as cocoanut, cottonseed, castor, etc. Mixtures of various members of these classes of ingredients may be used. There may also be used, particularly in mixtures with non-drying oils or fatty acids, such drying oils as sunflower, soya bean, hemp, linseed, or tung oil or the acids derived therefrom. A polyhydric alcohol, polycarboxylic acid and fatty acid or glyceride are heated together to give resins which are soluble in various organic solvents. This solubility is lost, however, when they are worked mechanically and simultaneously heated at elevated temperatures with 5% to 50% of their weight of a carbamide-aldehyde-alcohol condensate.

The carbamide-aldehyde-alcohol condensates may be prepared according to well known methods in which urea and formaldehyde are condensed with an alcohol in the presence of an acid catalyst. Water of reaction is removed by distillation, as with an azeotropic mixture of alcohol-benzene and water, or the water may be separated from refluxed solvent. Typical procedures are presented in U. S. Patents Nos. 2,019,865, issued November 5, 1935 and 2,171,882, issued September 5, 1939, etc. In conjunction with urea there may be used other carbamides, such as thiourea, and alkyl- or phenyl-substituted ureas, and also triazines, such as melamine, etc. Likewise part of the formaldehyde may be replaced with higher aldehydes, such as acetaldehyde, butyraldehyde, benzaldehyde, etc. The useful alcohols include not only the commonly used ethyl, propyl, butyl, and amyl alcohols but also the higher aliphatic alcohols, such as octyl, dodecyl, cetyl, octadecyl, etc., which are most readily introduced by alcoholysis of a carbamide-aldehyde-lower alcohol condensate. There may also be used ether-alcohols, polyhydric alcohols, ester-alcohols, halo-hydrins, or other compounds which possess a reactive, available hydroxyl group.

The reaction product of an alkyd resin and urea-formaldehyde-alcohol condensate may be modified with such materials as hard resins (including natural resins, ester gums, oil-soluble phenol-formaldehyde condensates, maleic anhydride-rosin condensates, etc.), plasticizers (like butyl phthalate, tricresyl phosphate, blown castor oil, etc.), waxes (like carnauba, montan, paraffin, candelilla, etc.), metallic soaps, dyes, pigments, mineral fillers, etc. In general, the total of all such modifying agents constitutes less than half of the non-reactive plastic composition.

Further details of the preparation of the reaction product here used are given in U. S. Patent No. 2,293,164, issued August 18, 1942. It is also there disclosed that the rubbery, converted plastic composition, which is obtained by mechanical mixing and simultaneous heating between about 120° C. and about 180° C., may be mixed with dispersing agents and/or protective colloids and dispersed in aqueous medium. As dispersing agent, there may be used a fatty acid soap, particularly an amine soap such as triethanolamine oleate, a salt of a sulfated alcohol or a sulfonated ether or a sulfonated amide derivative. In conjunction therewith a protective colloid, such as casein, glue, a water-soluble cellulose ether (like methyl cellulose), a gum (like arabic, karaya, or tragacanth), etc. is usually desirable. Cation-active dispersing agents, such as benzyl cetyl dimethyl ammonium chloride or octadecyloxymethyl dimethyl benzyl ammonium bromide, etc. may likewise be used provided the suspension of rubber hydrocarbons to be mixed therewith is also prepared with a cation-active agent.

The suspension of synthetic rubber and the suspension of the plastic composition may be mixed in a wide range of proportions. In the application of the mixed dispersions to the coating of paper there may be used preparations, the solids content of which contains from 2 to 15 parts of synthetic rubber for 98 to 85 parts of the plastic composition. Less than 2 parts of synthetic rubber per 100 parts of total solids will not give an appreciable effect. With 5 and 10 parts of synthetic rubber, grease-resistance is at a maximum without loss of other properties, while with more than 15 parts of rubber water-resistance falls off. When the poly-disperse system is applied to woven fabrics, etc., 15 to 40 parts of synthetic rubber may be used with 85 to 60 parts of the plastic composition on a solids basis. The optimum effects as to gloss, flexibility, etc. are here obtained with 30 to 35 parts of synthetic rubber to 70 to 65 parts of the plastic composition.

The following examples present details of the preparation of the highly condensed and non-reactive plastic compositions and their use with dispersions of rubber hydrocarbons.

*Example 1*

Five hundred parts of an alkyd resin having a 50% glycerol-phthalate content, prepared by heating glycerine, phthalic anhydride, cocoanut oil, and soya bean oil at 200°–210° C. until a homogeneous resin of low acid number was formed, was charged to a heated mixer and 400 parts of the reaction product of 500 parts of rosin, 67 parts of maleic anhydride, and 73 parts of glycerine, heated at 260° C. to an acid number of 35, was added followed by 130 parts of dibutyl phthalate. The mixture was kneaded at 140° C. for about one-half hour, the temperature then reduced, and 350 parts of a 50% urea-formaldehyde-butanol condensate in butanol added. The mixture was then worked and heated at 135° C. for an hour to produce a tough, rubbery mass. 120 parts of an aliphatic hydrocarbon solvent, boiling 150°–200° C., was then incorporated and the mass cooled. There was then added a paste consisting of 75 parts of casein, 45 parts of triethanolamine oleate, 40 parts of concentrated ammonium hydroxide and 425 parts of water. After the paste had been thoroughly worked into the resin, the resulting mixture was cut with water containing a little ammonia to a 50% solids basis.

Sixty-seven parts of this dispersion was mechanically mixed with 33 parts of a concentrated latex having a solids content of 60%. The resulting poly-disperse system was applied by knifing on a sateen and dried. Three such applications gave a coating which embossed well, was tough, was flexible at 0° C., and which held a finishing lacquer coat tenaciously.

One hundred forty parts of the dispersion of the converted plastic composition as prepared above was mixed with 50 parts of a vulcanized latex having a solids content of 50%. The resulting dispersion was applied by roller-coating on a woven cotton fabric. The coating adhered exceptionally well, was tough and flexible, and resisted ageing under an ultraviolet lamp.

Example 2

There were charged to a heated, mechanical mixer 75 parts of tricresyl phosphate, 375 parts of an alkyd resin prepared from glycerine, phthalic anhydride and sebacic acid, 250 parts of the alkyd resin used in Example 1, prepared from glycerine, phthalic anhydride, cocoanut oil, and soya bean oil, 375 parts of the resin from rosin, maleic anhydride, and glycerine, also described in Example 1, and 60 parts of ethyl cellulose. This mixture was heated and worked until homogeneous. It was then cooled to about 90° C. and 250 parts of a 50% butanol solution of a urea-formaldehyde-octyl alcohol condensate added. The temperature was raised to 140° C. and the mixture worked until homogeneous. This mixture was worked on rubber rolls with a casein paste as in Example 1. It was then worked in a mechanical kneader and diluted with water containing a small amount of ammonia to give a dispersion containing 50% solids.

A mixture was prepared from 150 parts of this dispersion and 15 parts of a latex having a 30% solids content. The dispersion was applied to paper by roller-coating and the paper dried. The grease-resistance of this coated paper, as measured by time of penetration, was 48 hours against 500 seconds for paper coated with the unmodified dispersion of converted plastic material.

A mixture was prepared from 144 parts of the dispersion of the converted plastic composition and 12 parts of a vulcanized latex having a solids content of 63%. The resulting dispersion was applied to paper and dried. This coated paper had a grease-resistance of 2200 seconds against 500 seconds for paper coated with the unmodified dispersion of converted plastic material.

Example 3

An alkyd resin was prepared from 100 parts of phthalic anhydride, 1 part of maleic anhydride, 92.5 parts of mixed saturated fatty acids, 24.5 parts of soya bean oil, and 63 parts of glycerine. Eighty parts of this resin was mixed with 22 parts of dibutyl phthalate and with 72 parts of the reaction product of 500 parts of rosin, 67 parts of maleic anhydride, and 73 parts of glycerine heated to 260° C. until an acid number of 35 was reached. The resulting mixture was placed in a heated mechanical kneader and 56 parts of a 50% urea-formaldehyde-butanol condensate in butanol and toluene added thereto. The entire mixture was worked for an hour at 125° C. and then cooled to 90° C., whereupon 18 parts of petroleum naphtha was added. The mixing was continued until the preparation had cooled to about room temperature. It was then sheeted on a rubber mill.

Two hundred parts of the sheeted material was then milled with 100 parts of a casein paste containing 1.5% of sodium alginate, 12% of casein, 3.1% of concentrated ammonia solution, 2.5% of phenol, 2.5% of boric acid, and 6% of triethanolamine oleate. The resulting product when homogeneous was adjusted with a 0.5% ammonium hydroxide solution to a solids content of 50%.

Equal parts of this dispersion and of a latex of Neoprene Type 60, also containing 50% of solids, were mixed. The resulting poly-dispersion was used for the coating of paper and of leather. Paper coated therewith increased somewhat in tear strength. There was little, if any, penetration of the paper and the film had a high gloss. Leather coated with the poly-dispersion was well-covered without penetration. Films deposited on metal had good gloss, were clear and firm, and had extremely good flexibility.

Example 4

The alkyd-urea resin reaction product in dispersed form, as prepared in Example 3, was mixed with a "Hycar OR" emulsion in the proportions of 25 to 75 and 75 to 25. This synthetic rubber is based on polymerized butadiene, apparently in association with acrylonitrile. In both cases the films formed from the poly-disperse system were definitely superior to films from either component and possessed properties not found in the individual films. The Hycar Or films on glass were continuous but had poor adhesion and were too extensible. The combination gave continuous films of increased firmness and toughness, and of improved adhesion.

Example 5

The alkyd-urea resin reaction product in dispersed form, as prepared in Example 3, was mixed with Thiokol NM and Thiokol NC emulsions in ratios of 25 to 75 and 75 to 25. While films from the Thiokol emulsions themselves were discontinuous, soft, and weak, films from the poly-disperse systems had much improved characteristics, being continuous, firmer, and more adhesive. The higher ratio of reaction product gave tough, firm films which were particularly suitable for sealing porous materials as a prime coat.

The poly-disperse systems which result from mixing a suspension or dispersion of a vulcanizable synthetic rubber and a suspension or dispersion of the plastic composition herein described are useful for impregnating and coating woven and felted fabrics. As coating compositions for cloth, they may be used as base coats for artificial leather and oil-cloth. In this use they give an extremely good "build" on the fabric, in this respect exceeding with three coats the results of eight lacquer coats. The deposited films give improved adhesion to cloth and to top coats of lacquer. Mixed dispersions may also be used as finish coats to give uniform gloss and grease-resistance. Gaskets of paper, asbestos, or other fibrous material may be treated with these dispersions to bind surface fibers and to prevent disintegration of the gasket unit. The mixed dispersions may be applied by dipping, spraying, brushing, roller-coating, etc.

Another type of use is in the beater sizing of paper. The resulting sheet has excellent ageing properties and can be directly lacquered with excellent adhesion of the lacquer coat to the paper.

We claim:

1. An aqueous poly-disperse system having in the disperse phase discrete particles containing a synthetic rubber of the vulcanizable type selected from the group consisting of (1) polymeric condensation products of organic dihalides and inorganic polysulfides, (2) copolymers of a conjugated diolefinic hydrocarbon and a member of the group consisting of styrene, acrylonitrile, and isobutylene, and (3) polymeric haloprenes, and separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble urea-formaldehyde-alcohol condensate.

2. An aqueous poly-disperse system having in the disperse phase particles of a polymerized haloprene and separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble urea-formaldehyde-alcohol condensate.

3. An aqueous poly-disperse system having in the disperse phase particles of a synthetic rubber comprising the polymeric condensation product of an organic dihalide and an inorganic polysulfide and separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble urea-formaldehyde-alcohol condensate.

4. An aqueous poly-disperse system having in the disperse phase from two to forty parts by weight of discrete particles containing a synthetic rubber of the vulcanizable type selected from the group consisting of (1) polymeric condensation products of organic dihalides and inorganic polysulfides, (2) copolymers of a conjugated diolefinic hydrocarbon and a member of the group consisting of styrene, acrylonitrile, and isobutylene, and (3) polymeric haloprenes, and from 98 to 60 parts by weight of separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble urea-formaldehyde-alcohol condensate.

5. The poly-disperse system of claim 4 in which the alcohol of the urea-formaldehyde-alcohol condensate is monohydric.

6. An aqueous poly-disperse system having in the disperse phase from 2 to 40 parts by weight of a rubbery copolymer of butadiene and acrylonitrile and from 98 to 60 parts of separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble urea-formaldehyde-alcohol condensate.

7. The poly-disperse system of claim 6 in which the alcohol of the urea-formaldehyde-alcohol condensate is monohydric.

JACK D. ROBINSON.
FREDERICK J. MYERS.